No. 895,363. PATENTED AUG. 4, 1908.
J. C. GREENWAY.
APPARATUS FOR THE CONCENTRATION OF ORES, MINERALS, &c.
APPLICATION FILED APR. 7, 1908.

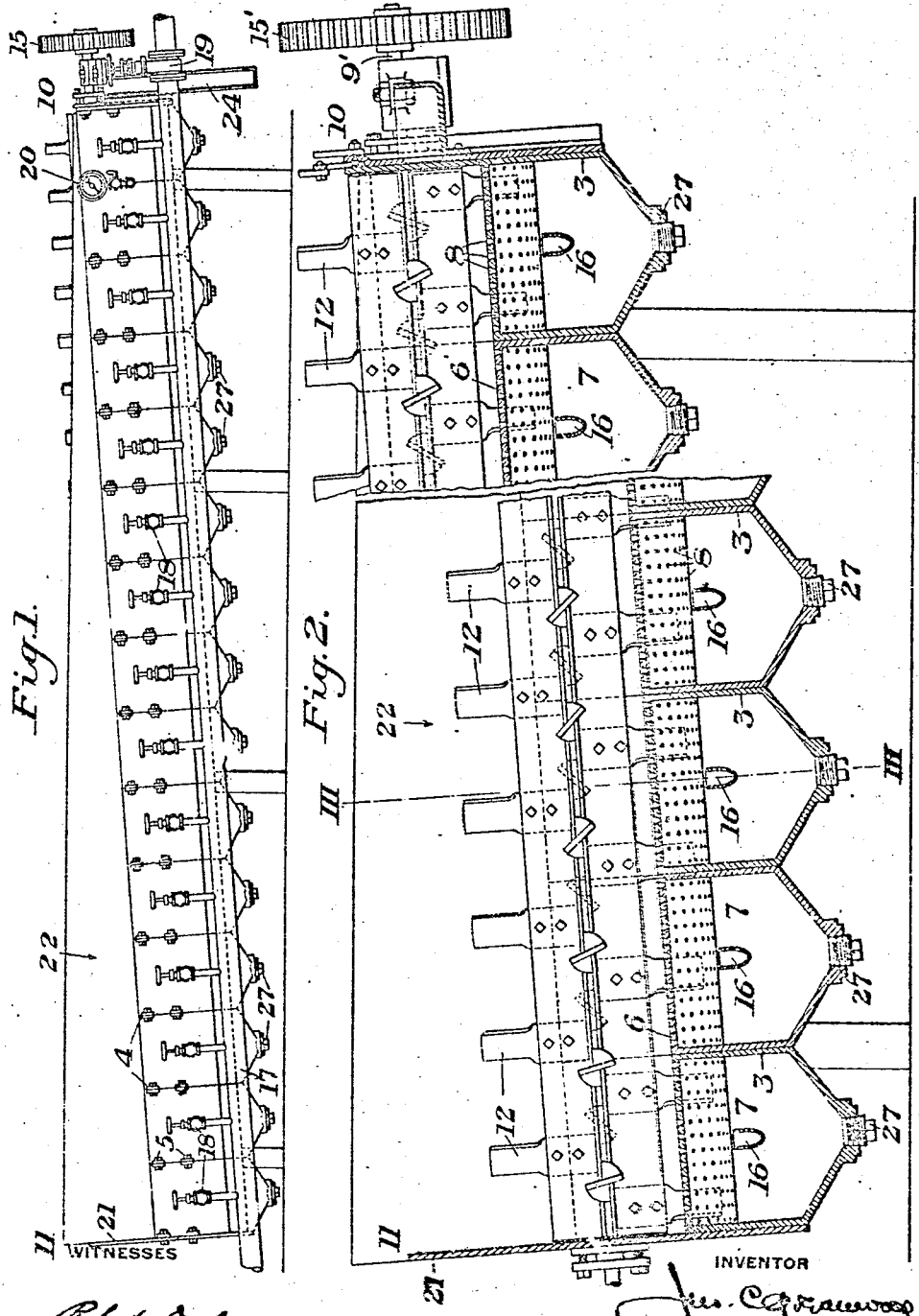

3 SHEETS—SHEET 2.

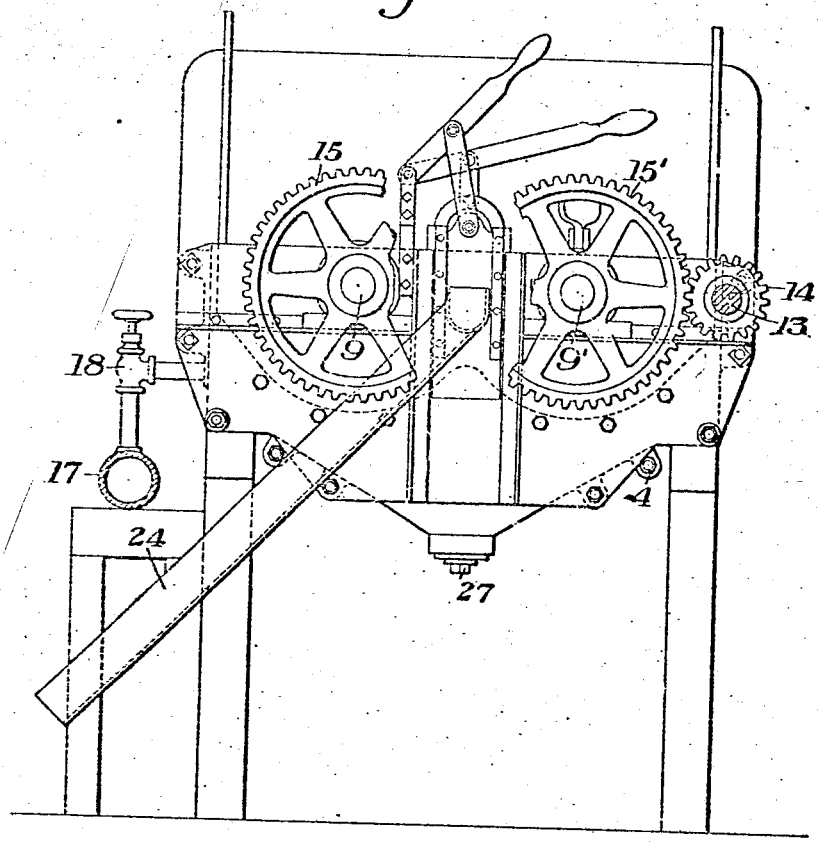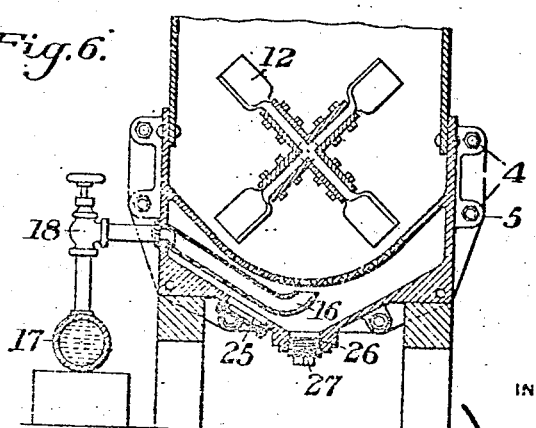

UNITED STATES PATENT OFFICE.

JOHN C. GREENWAY, OF COLERAINE, MINNESOTA.

APPARATUS FOR THE CONCENTRATION OF ORES, MINERALS, &c.

No. 895,363.  Specification of Letters Patent.  Patented Aug. 4, 1908.

Application filed April 7, 1908. Serial No. 425,763.

*To all whom it may concern:*

Be it known that I, JOHN C. GREENWAY, of Coleraine, in the county of Itasca and State of Minnesota, have invented a new and useful Improvement in Apparatus for the Concentration of Ores, Minerals, &c., of which the following is a full, clear, and exact description, reference being had to the accompanying drawings, forming part of this specification, in which—

Figure 3:
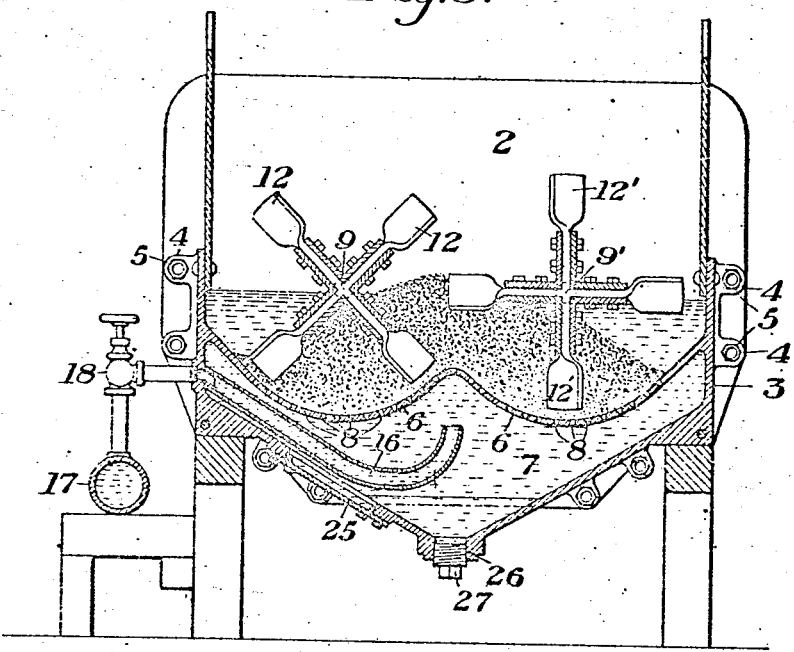
Figure 4:
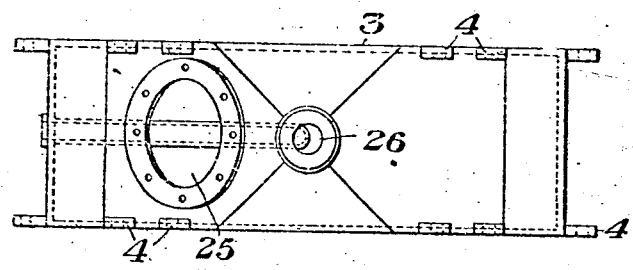

Figure 1 is a side elevation of one form of apparatus embodying my invention; Fig. 2 is a longitudinal vertical section on a larger scale, and partly broken away; Fig. 3 is a cross section on the line III—III of Fig. 2; Fig. 4 is a bottom plan view of one of the sections of which my improved apparatus is comprised; Fig. 5 is a front elevation of the apparatus, and Fig. 6 is a modification in cross section of my invention.

The object of my invention is to provide a new and improved concentrator for ores and other materials which is of simple and durable construction and of efficient operation.

I carry out my invention by providing a trough composed of sections in which the ore or other material is concentrated by series of agitators which thresh out the ore and enable a water supply to carry off the substances, such as gangue, sand, clay, etc., from which it is desired to free the ore.

Referring to the drawings, 2 is a trough composed of a plurality of sections 3, having ears 4, by which said sections are bolted together by bolts 5, to form the trough. Each of the sections 3 has a false bottom 6 which is of double trough form, and which is perforated, as shown at 8, and is provided with a water chamber 7, thereunder. The two parallel shafts 9 9', which are suitably journaled at the ends 10 and 11 of the trough, respectively, are positioned longitudinally above said false bottoms and have paddles or agitators 12 12', radially mounted thereon. The shafts 9 9' are revolved by the driving shaft 13, through the gear wheel 14, mounted thereon and the gear wheels 15 15' positioned on the shafts 9 9' respectively which drive the shafts in opposite directions.

Water is introduced into the chambers 7 preferably by goose-necked pipes 16, which tap the water main 17 and each of which has an independent valve 18, by means of which the water supply for each section of the trough can be regulated as desired. The water main also has a regulating valve 19, and a gage 20, to show the water pressure. The trough 2 slopes slightly from the end 10 to the end 11 to permit the water to carry off over the tail-board 21 at the end 11.

In operation, the ores or other materials to be concentrated are discharged into the trough 2 at 22, or at any other point or points best suited to the ore to be concentrated, and are propelled toward the end 10 by the paddles 12 12', which are revolved in opposite directions and have their respective faces oppositely turned, and are preferably of the general shape and arrangement of propeller blades. The action of the paddles disintegrates the mass of the ore, working it over and upon the false bottoms 6, and enables the water which is forced into the chambers 7 by the pipes 16 and main 17 under pressure and which enters the trough through the perforations 8 from the water chambers, to flow over the tail-board or gate 21, at the lower end 11 of the trough. The discharge ends of the pipes 16 are preferably located underneath the central portion of the false bottom 6, so that the pressure of the water will be more uniform at both sides of the trough. The water carries with it the lighter substances, such as sand, gangue, etc., which are present in the ore, and from which it is desired to free it. The heavier materials, having a higher specific gravity than the substances carried off by the water are forced forward and upward along the incline of the trough by the paddles 12 12', to the end 10, and are discharged in concentrated form through the chute 24. The man-holes 25 afford access to the water chambers 7, located in the various sections, while the opening 26, which is ordinarily covered with a cap or plug or by some other form of gate valve 27, may also be used to free the chamber from the sediment which may have filtered in through the perforations 8.

To diminish the agitation of the materials, and thus prevent the lighter ores from being carried over the tail-board with the waste, I preferably change the size or angularity or pitch or both, of the paddles which are adjacent to the end 11 of the trough. This change can be readily made as the paddles 12 12' are adjustably mounted on the shafts 9 9'. I also find that the ore collects at a greater depth at the discharging end 10 than at the end 11, and I therefore preferably employ a stronger pressure and greater volume of water adjacent to 10 than at 11. It will be seen that this can readily be done by regulation of the valves.

Ordinarily iron ores when mined vary largely in their mineral content. Often a fixed mineral content is desired in such ores, and one of the advantages of my invention is that by the regulation of the water pressure by means of the valves both lean and rich ores, varying widely in their mineral content, may be economically treated and a uniform product can be obtained, regardless of the character of the ore introduced into the trough, since by variation of the pressure and volume of water, a lean ore can be made uniform with a rich one.

In carrying out my invention, I preferably employ the form shown in Figs. 1 to 5, but satisfactory results may be obtained from the use of the form shown in Fig. 6, in which I employ a trough having only one shaft and one series of beaters or agitators located thereon.

Many changes may be made in the form of my construction, without departing from my invention, since

What I claim is:

1. A concentrator for ore and other materials, comprising an elongated trough-like vessel, the major portion of whose bottom is provided with closely adjacent small holes or perforations therethrough, a water compartment below said bottom from which water under pressure is admitted through said perforations, and means for mechanically moving the ore or other material longitudinally in one direction in the vessel and for permitting the water to carry off in suspension the gangue and other material in the opposite direction.

2. A concentrator for ore and other material, comprising an elongated trough-like vessel, having a false bottom provided with a multiplicity of small holes or perforations which are of reduced diameters at the lower ends, a water compartment below said bottom, means for admitting water under controllable head to said compartment, and one or more parallel shafts in said vessel having mounted thereon a series of paddles for moving the ore or other material longitudinally in one direction, and permitting the water to carry off in suspension sand, gangue, and other material, in the opposite direction.

3. A concentrator, comprising an elongated trough-like vessel supported in an inclined position and formed by a series of connected sections in form of a trough, each section having a hollow compartment in its bottom, the roof of which compartment is adapted to form the floor of said trough and which is perforated to admit water under controllable head independently in each section, with one or more parallel shafts in said vessel having a series of paddles mounted thereon and revolving in opposite directions to move the ore mechanically to the higher end of the trough and deliver the same in dewatered form, and permitting the water to carry off in suspension sand, gangue and other material in the opposite direction together with means for admitting water under controllable head to each hollow compartment.

4. A concentrator comprising an elongated trough-like vessel, having a water compartment in its lower portion, such water compartment consisting of one or more independent sections, and provided with means for introducing water under controllable pressure and independently into each section, with perforated bottoms, through which water is forced, said bottoms being of a double trough form, and a series of paddles arranged to rotate within each portion of said trough to move the ore longitudinally therein in one direction to a point above the level of water, and permitting the sand, gangue and other material to flow off in the opposite direction.

5. A concentrator, comprising a trough-like vessel supported in inclined position, and having a concave perforated false bottom and water compartments below the false bottom, one or more shafts extending longitudinally within the vessel above the false bottom, said shafts having paddles mounted thereon, the paddles at the lower end of the vessel having a greater angularity to the shaft than those at the higher end.

6. An ore concentrator comprising an elongated inclined trough built up of sections bolted together and containing one or more parallel shafts with a series of paddles mounted thereon; said sections having perforated false bottoms, to admit water into the trough above, together with supply pipes and valves to furnish water under pressure to each section independently of the other sections, the sections having a bottom in the form of a hollow inverted pyramid with a valve at bottom for drawing off of sediment, said pipes having goose neck extensions inside of said sections for the delivery of water to the center portion of the compartment, and to give uniform pressure and prevent the closing or stoppage of water supply.

7. An ore concentrator, comprising an elongated trough-like vessel having a water compartment at its lower portion, means for introducing water under pressure into said compartment, a perforated false bottom through which the water is forced, said false bottom being of a double trough-form, and a series of paddles arranged to rotate within each portion of said bottom and to force the material longitudinally therein, and also laterally from the center.

8. An ore concentrator having a trough with a perforated bottom and at least one shaft located therein and having a series of paddles mounted thereon for moving ore slowly and with a minimum amount of agitation in the direction of the higher end of the trough, in combination with a series of independent water chambers underneath the perforated bottom of said trough, suitably connected with a water main and a water supply adapted to form a multitude of sorting columns throughout said trough, with the effect of separating any material in said trough along the lines of different specific gravities, sand, gangue and other materials being carried off in suspension in the water over the lower end or tail board of the trough, and the heavier materials being forced in the opposite direction to the discharging end and there delivered in de-watered form together with separate water supply means for each of said water chambers, with means for regulating the supply to each chamber independently.

9. An ore concentrator, comprising an elongated trough-like vessel supported in inclined position, and having a perforated false bottom of double trough form, a plurality of separate water compartments in the lower portion of the vessel below said false bottoms, separately controllable supply connections for said compartments, and a series of agitators arranged to operate above the false bottoms; substantially as described.

In testimony whereof, I have hereunto set my hand.

JOHN C. GREENWAY.

Witnesses:
ROBERT D. LYONS,
HERBERT F. KENNY.